S. HANSSON & I. MOELLER.
TRUCK BOLSTER OR OTHER CAR PART.
APPLICATION FILED APR. 1, 1914.
1,121,623.
Patented Dec. 22, 1914.
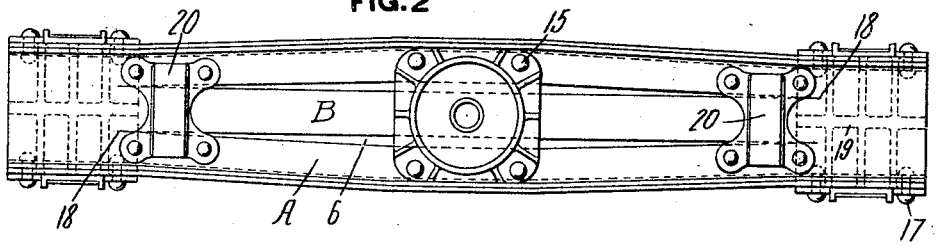
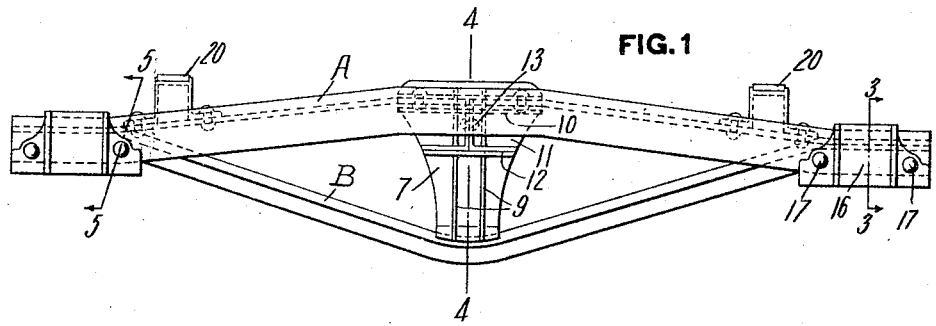
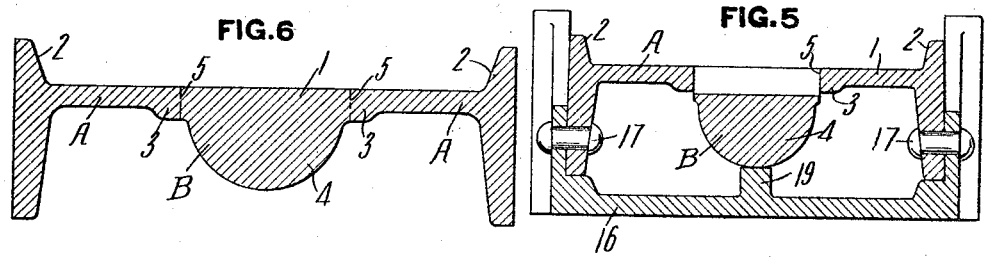
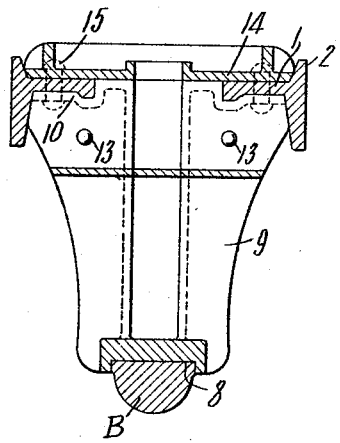
WITNESSES
W. J. Holman
Elbert L. Hyde
INVENTORS
Sören Hansson
Isak Moeller
By Fredk. W. Winter

UNITED STATES PATENT OFFICE.

SOREN HANSSON AND ISAK MOELLER, OF NEW GLASGOW, NOVA SCOTIA, CANADA, ASSIGNORS OF ONE-THIRD TO HENDERSON B. DOUGLAS, OF NEW GLASGOW, NOVA SCOTIA, CANADA.

TRUCK-BOLSTER OR OTHER CAR PART.

1,121,623.    Specification of Letters Patent.    Patented Dec. 22, 1914.

Application filed April 1, 1914. Serial No. 828,842.

*To all whom it may concern:*

Be it known that we, SOREN HANSSON and ISAK MOELLER, residents of New Glasgow, in the Province of Nova Scotia and Dominion of Canada, have invented a new and useful Improvements in Truck-Bolsters or other Car Parts, of which the following is a specification.

This invention relates to car parts such as truck bolsters, brake beams or truck side frames.

The object of the invention is to provide a car part of the type described which is of simple construction, which can be readily manufactured, which gives maximum strength for the amount of metal employed, which can be manufactured from standard rolled sections, which can be readily assembled, and which is very durable and not liable to fail under service conditions.

In the drawings, which represent one embodiment of the invention, Figure 1 is a side elevation; Fig. 2 is a plan view; Fig. 3 is a cross section on the line 3—3, Fig. 1; Fig. 4 is a cross section on the line 4—4, Fig. 1; Fig. 5 is a cross section on the line 5—5, Fig. 1; and Fig. 6 is a cross sectional view showing the shape of the rolled member from which the car part is produced.

In the drawings the invention has been shown as a truck bolster, but this is merely for the purpose of illustration, and it is to be understood that the invention is equally applicable to brake beams, truck side frames, or to any other car member in which a beam effect is to be secured. The truck bolster shown has its compression and tension members formed as integral parts of the same member, which is preferably a rolled metal member having a cross sectional shape shown in Fig. 6, that is, a modified channel section having a web 1 and flanges 2, said flanges being wider on one side of the web than on the other. The middle portion of the web is thickened or reinforced, as at 3, and this thickened portion is preferably provided with a large or massive rib 4 shown as having a semicircular cross section and lying on the same side of the web as the wider portions of the flanges 2. This is a standard cross sectional shape, but can be specially rolled without difficulty when necessary.

In constructing the bolster shown a member having the cross sectional shape shown in Fig. 6 and having the proper length is split longitudinally along two parallel lines, indicated by the dotted lines at 5 in Fig. 6 and forming the longitudinal slits 6. These slits stop somewhat short of the extreme ends of the rolled member and lie on the opposite sides of the thickened rib 4, the metal being sheared through the thickened portion 3 so as to obtain a greater shearing value along the edges of the slits. By shearing the metal in this way a portion of the web is left attached to each of the flanges 2 and the rolled member is separated into three distinct parts, two side members A of substantially T-shape and a central solid member B.

The central member B is depressed or bent downwardly between its ends to form the bottom or tension member of the bolster, while the side members A are bent upwardly and spread apart. The side members A are elevated to a less amount than the central member is depressed, but the lateral spread given to those members compensates for the difference, so that the three members when bent to the form shown in Figs. 1 and 2 are in the condition of no strain and have neither been compressed nor stretched. Also, by spreading the upper members apart a greater section modulus sidewise is secured in the compression member.

The tension and compression members of the bolster are connected by a center brace, which comprises a casting 7 having its lower end channeled, as at 8, to fit the top surface of the depressed member B, said casting also having vertical ribs 9 extending both longitudinally and horizontally or transversely of the bolster. At its upper end the casting 7 is provided with opposite longitudinally extending flanges 10 lying under the web portions of the side compression members A and supporting the same. One of the upper corner portions of the casting 7 is made as a separate member 11, which separates from the other portion of the casting along the line 12, Fig. 1. This arrangement enables the center brace to be readily inserted into position from the side. The larger part is inserted first in a tilted position, and is then turned up. The smaller part of the casting is then inserted and is secured to the other part as by rivets 13.

The usual center plate or bearing plate 14 is applied to the upper surfaces of the flanged portions of the side members and directly above the center brace, as shown in Fig. 4, and the center brace, compression members A and bearing plate 14 are then securely fastened together as by rivets 15.

The end portions of the bolster are provided with the usual end column castings 16, which in the present form are shown as channel parts having their flanges riveted to the wider flange portions of the main rolled member as at 17. The end column castings, however, are made of such length that they extend inwardly from the end of the bolster beyond the ends of the slits in the main member, indicated at 18, and said castings are each provided with a central longitudinal rib or projection 19 lying directly under and supporting the central rib 4 of the main member. The central longitudinal portion of the bolster is consequently supported by the end column casting on both sides of the ends of the slits or openings, which prevents any liability of these slits opening up farther because of shock or vibration in use. The bolster may also be provided with the usual side bearings 20, which are shown as riveted directly to the web portions of the compression members A at points just within the ends of the slits in the bolster, and which therefore also act as tie plates for securing the side members A together and preventing them from spreading.

The bolster described is of simple construction, is very durable and is exceedingly strong for the amount of metal used. The tension and compression members are bent into the form shown without stretching or compressing the metal and at the same time the lateral section modulus of the bolster is increased. The side members are very strong both horizontally and vertically. In the horizontal direction the web portions 1 of the side members reinforce them against lateral strain while in the vertical direction they are reinforced by the flanges 2. The web portions 1 of the side members also rest directly upon the center brace and form an efficient connection thereto. The depressed metal member of the bolster is a solid member and is therefore strong in all directions. It is sheared from the web of the bolster along reinforced or thickened lines, so that a greater shearing value is produced at the ends of the slits and reduces the liability of the slits opening up or lengthening. The bolster can be readily constructed from commercial shapes and can be adapted for any use where a beam effect is desired.

What we claim is:—

1. A car part having its compression and tension members formed of a single integral member having flanges and a web provided with a thickened central longitudinal portion, said web being slit longitudinally along two parallel lines so as to leave a portion of the web connected to each flange, the slits stopping short of the ends of said member, the flange portions being bent upwardly to form compression members and the intermediate thickened portion of the web being bent downwardly to form a tension member, and a center brace connecting the tension and compression members.

2. A car part having its compression and tension members formed of a single integral member having a web and side flanges, said web being sheared longitudinally along two parallel lines so as to leave a portion of the web connected to the side flanges, the slits thus formed stopping short of the ends of the said members, the side flange portions being bent upwardly and the intermediate portion being bent downwardly, and a center brace resting on the depressed central member and at its upper end connected to and supporting the web portions of the raised side members.

3. A car part having a tension member bent downwardly and two compression members bent upwardly and spread apart, and a center brace connecting said tension and compression members, said center brace being formed in two parts adapted to be inserted into position from one side and then secured together.

4. A car part having its compression and tension members formed of a single integral member having flanges and a web, said web being sheared longitudinally on two parallel lines so as to leave a portion of the web connected to each flange, the slits stopping short of the ends of the member, the flange portions being bent upwardly and the intermediate portion of the web being bent downwardly, and end column members secured to the ends of said car part, and provided with means for supporting the central portion of the web on each side of the ends of said slits.

5. A car part having its compression and tension members formed of a single integral member having flanges and a web, said web being sheared longitudinally on two parallel lines so as to leave a portion of the web connected to each flange, the slits stopping short of the ends of the member, the flange portions being bent downwardly, and end column members secured to the ends of said car parts, said end column members being channel shaped in cross section and being provide with a central longitudinal rib supporting the central portion of the web of said car part on both sides of the ends of said slits.

6. A car part having its compression and tension members formed of a single integral member having flanges and a web provided with a thickened central longitudinal portion having a rib, said web being slit longitudinally through the thickened portion thereof on opposite sides of said rib so as to leave a portion of the web connected to each flange and thereby forming a central and two side members, the side members being bent upwardly and the central member being bent downwardly to form the compression and tension members.

7. A car part having its compression and tension members formed of a single integral member having flanges and a web provided with a thickened central longitudinal portion having a rib, said web being slit longitudinally through the thickened portion thereof on opposite sides of said rib so as to leave a portion of the web connected to each flange and thereby forming a central and two side members, the side members being bent upwardly and the central member being bent downwardly to form the compression and tension members, and a central brace resting on the depressed member and supporting the two elevated side members.

In testimony whereof, we have hereunto set our hands.

SOREN HANSSON.
ISAK MOELLER.

Witnesses:
JAMES ROY,
ARTHUR GARRETT.

Copies of this patent may be obtained for five cents each, by addressing the "Commissioner of Patents, Washington, D. C."